United States Patent [19]

McFetridge

[11] Patent Number: 4,769,692
[45] Date of Patent: Sep. 6, 1988

[54] METHOD AND APPARATUS FOR CALIBRATING THE PHASE OF A VIDEO SIGNAL

[75] Inventor: Grant McFetridge, Nevada City, Calif.

[73] Assignee: The Grass Valley Group, Inc., Grass Valley, Calif.

[21] Appl. No.: 32,142

[22] Filed: Mar. 27, 1987

[51] Int. Cl.$^4$ .......................... H04N 5/06; H04N 9/44
[52] U.S. Cl. ...................................... 358/19; 358/267; 358/324; 358/337; 455/260
[58] Field of Search ................. 358/19, 181, 183, 267, 358/320, 324, 337; 455/260, 234, 304

[56] References Cited

U.S. PATENT DOCUMENTS

| | | | |
|---|---|---|---|
| 3,860,952 | 1/1975 | Tallent | 358/19 |
| 4,170,023 | 10/1979 | Yamakoshi | 358/19 |
| 4,517,587 | 5/1985 | Aizawa | 358/19 |
| 4,611,239 | 9/1986 | Shanley | 358/19 |
| 4,626,890 | 12/1986 | Ryan | 358/319 |
| 4,635,097 | 1/1987 | Tatami | 358/19 |
| 4,680,621 | 7/1987 | Baker | 358/19 |
| 4,688,081 | 8/1987 | Furuhata | 358/337 |
| 4,691,226 | 9/1987 | Freyberger | 358/19 |

Primary Examiner—Tommy P. Chin
Attorney, Agent, or Firm—Francis I. Gray; John Smith-Hill

[57] ABSTRACT

The color burst of a first video signal is brought into a desired phase relationship with the color burst of a second video signal by generating a first number which is representative of the phase relationship between the burst of the second video signal and a calibration reference signal and generating a second number which is representative of the phase relationship between the burst of the first video signal and the calibration reference signal. The second number is compared with the first number, and the phase of the burst of the first video signal is adjusted automatically in a manner such as to achieve a predetermined relationship between the second number and the first number.

3 Claims, 1 Drawing Sheet

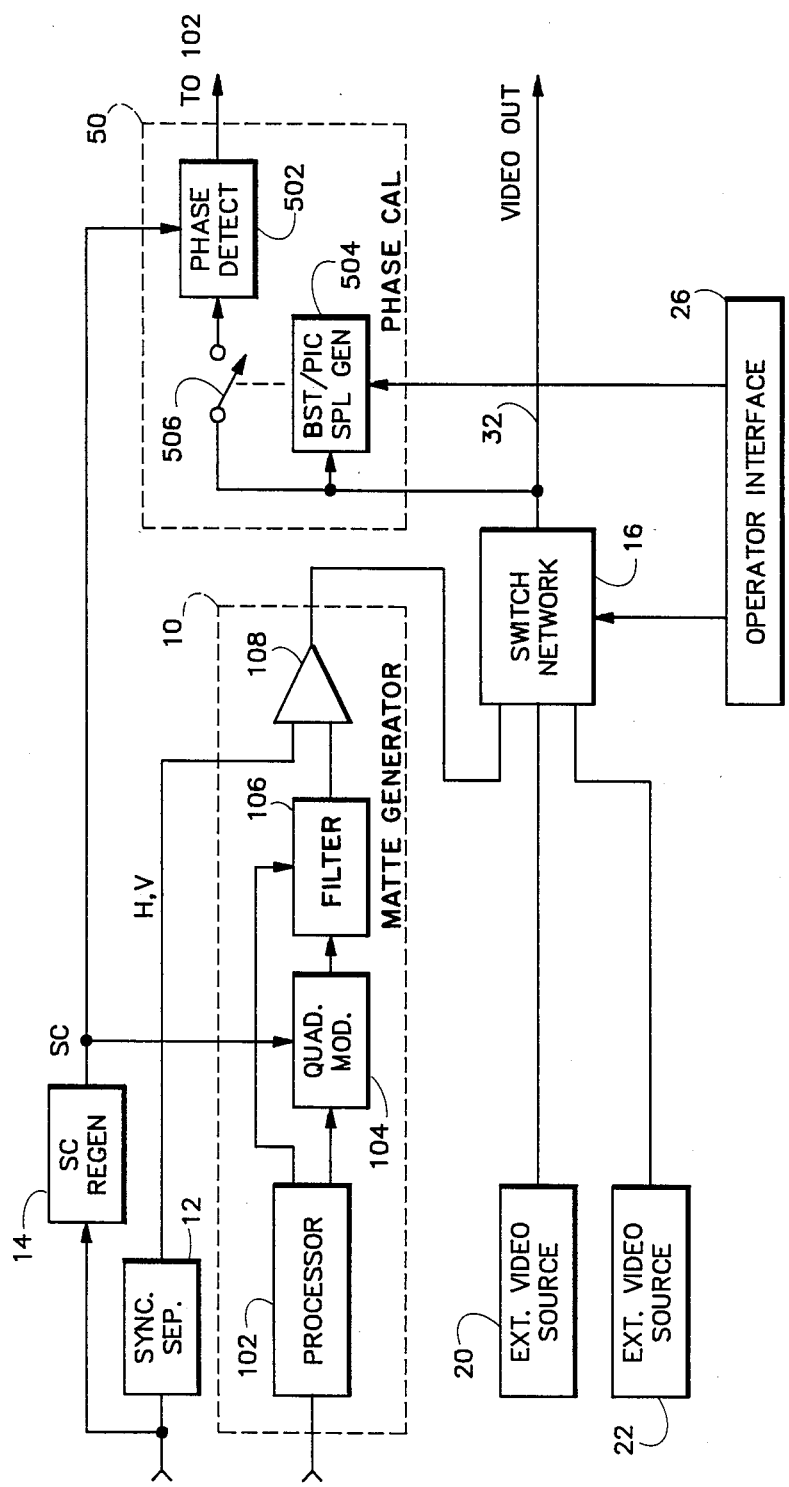

METHOD AND APPARATUS FOR CALIBRATING THE PHASE OF A VIDEO SIGNAL

This invention relates to a method and apparatus for calibrating the phase of a video signal.

BACKGROUND OF THE INVENTION

A conventional matte generator receives input signals representative of luminance, hue and saturation from an operator interface, and combines the luminance information with the chromaticity (hue and saturation) information to provide color difference signals. The matte generator also receives a black burst signal, i.e. a signal containing sync and burst but no picture information, and the black burst signal is applied to a sync separator and a subcarrier regenerator. The sync separator provides horizontal and vertical sync signals, and the subcarrier regenerator provides a continuous wave (c.w.) reference subcarrier signal in predetermined phase relationship to the burst of the black burst signal. The luminance and chrominance signals, the horizontal and vertical sync signals and the c.w. reference subcarrier signal are applied to an encoder which provides a composite matte signal at its output. The matte signal represents a solid color.

A production switcher may be used to combine an internally-generated matte signal with an external video signal. In order to combine the signals satisfactorily, the horizontal and vertical sync pulses of the matte signal must be aligned in time with the horizontal and vertical sync pulses of the external video signal. This is accomplished by use of a variable delay interposed between the sync separator and the encoder of the matte generator. Moreover, the burst of the matte signal must be in phase with the burst of the external video signal. It is conventional to achieve the desired phase relationship using a vector monitor. The phase relationship between the burst of the external video signal and a c.w. reference subcarrier signal of arbitrary phase, e.g. the reference subcarrier signal that is applied to the encoder, is measured using the vector monitor, and then the phase relationship between the burst of the matte signal and the c.w. reference subcarrier signal is measured. The phase of the burst of the matte signal is adjusted, using a variable delay interposed between the subcarrier regenerator and the video encoder, until the phase offset between the burst of the matte signal and the reference subcarrier signal is the same as the phase offset between the burst of the external video signal and the reference subcarrier signal.

In order to carry out this procedure for phase adjustment, it is necessary for the operator of the switcher to have access to a vector monitor and it is necessary for the operator to focus attention on the vector monitor and the adjustment of the variable delay.

SUMMARY OF THE INVENTION

In a preferred embodiment of the present invention, the color burst of a first video signal is brought into a desired phase relationship with the color burst of a second video signal by generating a first number which is representative of the phase relationship between the burst of the second video signal and a calibration reference signal and generating a second number which is representative of the phase relationship between the burst of the first video signal and the calibration reference signal. The second number is compared with the first number, and the phase of the burst of the first video signal is adjusted automatically in a manner such as to achieve a predetermined relationship between the second number and the first number.

BRIEF DESCRIPTION OF THE DRAWINGS

For a better understanding of the invention, and to show how the same may be carried into effect, reference will now be made, by way of example, to the accompanying drawing, the single figure of which is a block diagram of a production switcher embodying the present invention.

DETAILED DESCRIPTION

The switcher illustrated in the drawing includes an internal matte generator 10 having adjustable subcarrier phase. Preferably, the matte generator is of the kind described in co-pending application No. 32,140 filed Mar. 27, 1987 by Grant T. McFetridge entitled "Video Matte Generator", the disclosure of which is hereby incorporated by reference herein. The matte generator 10 includes a processor 102 which computes coefficients which are functions of respective color difference values and generates output signals which are representative of these coefficients. The output signals provided by the processor 102 are applied to a quadrature modulator 104. The quadrature modulator comprises two modulators which receive the output signals generated by the processor at their modulation inputs and receive subcarrier frequency signals, substantially in phase quadrature, at their carrier inputs. The resulting chrominance signal is combined with a luminance component signal in a filter 106, and horizontal and vertical sync signals are added in a summing amplifier 108. The output signal of the amplifier 108 is a composite video signal representative of a solid color. Gain, offset and quadrature errors in the quadrature modulator are compensated by adjusting the values of the coefficients computed by the processor, in the manner described in the co-pending application. The sync and subcarrier signals that are used in the matte generator to create the composite video signal are provided by a sync separator 12 and a subcarrier regenerator 14 which are incorporated in the switcher and receive a composite video signal.

The matte signal provided by the matte generator 10 is applied to a switching network 16, which also receives external video signals from external composite video sources 20, 22. The external video sources may be cameras or video tape recorders, for example. In normal operation, the switching network 16 combines the matte signal with a selected external video signal under control of control signals which are applied to the switching network by an operator interface 26. The resulting output video signal is made available at a terminal 32 of the switching network. As noted previously, in order for the matte signal to be properly combined with a selected external video signal, it is necessary for the burst of the matte signal to be in phase with the burst of the external video signal at the switching network.

The horizontal and vertical sync pulses of the matte signal are brought into alignment with the horizontal and vertical sync pulses of the selected external video signal in conventional manner. The burst of the matte signal is brought into phase with the burst of the selected external video signal by use of a phase calibration circuit 50. The phase calibration circuit 50 receives both the signal provided at the terminal 32 of the switching network and a continuous wave reference subcarrier signal provided by the subcarrier regenerator 14. The phase calibration circuit 50 comprises both a phase detector 502 and a burst/picture sample generator 504. The burst/picture sample generator 504 receives the output signal of the switching network. When the burst/picture sample generator is activated by a control signal received from the operator interface 26, it causes a switch 506 at the input of the phase detector 502 to close, i.e. become conductive, during the burst interval of the output signal of the switching network, and then re-open. The phase detector compares the phase of the video signal that was received while the switch 506 was closed with the phase of the reference subcarrier signal and generates a number which represents the phase difference between the burst of the output signal of the switching network and the reference subcarrier signal. This routine is performed first with the selected external video signal being transmitted by the switching network to the terminal 32 without modification and then with the matte signal being transmitted by the switching network to the terminal 32 without modification. The two numbers that are generated by the phase detector in response to the external video signal and the matte signal respectively are input to the processor 102 where they are compared and the difference value is applied to the matte generator and used to adjust the phase of the matte signal by adjusting the values of the coefficients that are computed by the processor, in the manner described in the co-pending application. Alternatively, the phase adjustment may be accomplished by use of a programmable delay line.

The phase calibration circuit 50 may also be used to bring the bursts of all the external video signals into phase with one another. For example, assuming that it is desired to bring the burst of the external video signal provided by the source 20 into phase with the burst of the external video signal provided by the source 22, the phase difference is measured in the manner described and is used to adjust the subcarrier phase of the external video signal that is generated by the source 20, e.g., by use of a variable delay (not shown).

In this specification, the term "video signal" is used to refer to a signal that conforms to certain standards such that the signal may be used to create an intelligible display on a video display device, such as a television set, and the term "matte signal" is used to refer to a video signal that represents a solid color.

It will be appreciated that the present invention is not restricted to the particular embodiment that has been described, and that variations may be made therein without departing from the scope of the invention as defined in the appended claims and equivalents thereof. For example, it is not essential to measure the phase relationship between the burst of the matte signal and the burst of the selected external video signal by reference to a continuous wave reference subcarrier signal, since with a sufficiently linear and stable measurement circuit, the phase relationship could be measured directly.

I claim:

1. A method of calibrating the phase of the burst of a first video signal to bring it into a desired phase relationship with the burst of a second video signal, comprising the following steps:
    (a) generating a first number representative of a phase difference between the burst of the first video signal and a calibration reference signal,
    (b) generating a second number representative of a phase difference between the burst of the second video signal and the calibration reference signal,
    (c) comparing the second number with the first number to obtain a phase difference number, and
    (d) automatically adjusting the phase of the burst of the first video signal in response to the phase difference number to change the first number so as to make the phase difference number equal to a predetermined value representative of the desired phase relationship.

2. A method according to claim 1, wherein step (a) is performed after step (b) and step (b) comprises the operation of storing the second number until the first number has been generated.

3. A method according to claim 1, comprising adjusting the phase of the burst of the first video signal in a manner such as to achieve substantial equality between the first number and the second number.

* * * * *